United States Patent [19]

Matje et al.

[11] Patent Number: 4,756,482

[45] Date of Patent: Jul. 12, 1988

[54] PROCESS FOR THE MANUFACTURE OF SINTERABLE SILICON CARBIDE AND/OR BORON CARBIDE POWDERS

[75] Inventors: Peter Matje, Wiggensbach; Karl A. Schwetz, Sulzberg, both of Fed. Rep. of Germany

[73] Assignee: Elektroschmelzwerk Kempten GmbH, Munich, Fed. Rep. of Germany

[21] Appl. No.: 77,096

[22] Filed: Jul. 22, 1987

Related U.S. Application Data

[63] Continuation of Ser. No. 837,093, Mar. 6, 1986, abandoned.

[30] Foreign Application Priority Data

Mar. 7, 1985 [DE] Fed. Rep. of Germany ....... 3508171

[51] Int. Cl.$^4$ .............................................. B02C 23/18
[52] U.S. Cl. ......................................... 241/16; 241/22
[58] Field of Search ................. 241/15, 16, 17, 22, 241/23

[56] References Cited

U.S. PATENT DOCUMENTS

| | | | |
|---|---|---|---|
| 2,354,727 | 8/1944 | Wulff | 241/15 X |
| 2,863,800 | 12/1958 | Gottfried | 241/16 X |
| 3,068,110 | 12/1962 | Fagerholt | 241/15 X |
| 3,068,181 | 12/1962 | Schaeffer | 241/16 X |
| 3,476,325 | 11/1969 | Groszek | 241/16 |

FOREIGN PATENT DOCUMENTS

| | | | |
|---|---|---|---|
| 1158348 | 11/1963 | Fed. Rep. of Germany | 241/15 |
| 1232004 | 1/1967 | Fed. Rep. of Germany | 241/15 |
| 207500 | 3/1984 | Fed. Rep. of Germany | 241/16 |
| 2142840 | 1/1985 | United Kingdom | 241/16 |
| 638561 | 12/1978 | U.S.S.R. | 241/16 |

*Primary Examiner*—P. W. Echols
*Assistant Examiner*—Joseph M. Gorski
*Attorney, Agent, or Firm*—Burgess, Ryan & Wayne

[57] ABSTRACT

The invention is a process for the manufacture of sinterable silicon carbide and/or boron carbide powders having a maximum particle size of 1 μm and finer. The process is carried out by wet grinding in aqueous suspension using mills charged with a grinding medium and with the addition of antioxidants in the presence of surfactants and subsequent wet chemical treatment with an aqueous potassium hydroxide solution. The wet grinding can be carried out, for example, with the addition of hydroquinone in the presence of quaternary ammonium salts and the wet chemical treatment with a 5-50% by weight aqueous potassium hydroxide solution under normal pressure at temperatures in the range of from room temperature to the boiling temperature of the reaction mixture or under elevated pressure at temperatures of up to 300° C.

10 Claims, No Drawings

PROCESS FOR THE MANUFACTURE OF SINTERABLE SILICON CARBIDE AND/OR BORON CARBIDE POWDERS

This application is a continuation of application Ser. No. 837,093 filed Mar. 6, 1986 now abandoned.

It is known that the properties of sintered bodies depend to a great extent on the nature of the starting powders used for the manufacture of the sintered bodies by known powder metallurgy processes. For example, for the pressureless sintering of silicon carbide, boron carbide or mixtures thereof, very fine starting powders are required. The powders must meet certain requirements not only with regard to particle size and particle size distribution but also with regard to content of impurities. Such powders must be sinterable to a required degree and be substantially free of foreign substances which may interfere with the sintering process or lead to undesirable foreign substances in the finished sintered body.

BACKGROUND OF THE INVENTION

Silicon carbide produced by the Acheson process is generally used to prepare sinterable silicon carbide powders, for economic reasons and because of its readier availability. Silicon carbide produced by the Acheson process, because of the high manufacturing temperatures required in the process, consists mainly of the thermodynamically more stable α-modification. Alpha-silicon carbide is used herein as meaning hexagonal and rhombohedral poly-types as well as a proportion of cubic SiC which cannot be excluded. Silicon carbide powders are obtained in the required fineness by intensive grinding of compact grains obtained from industrial SiC production. After grinding, the fine powders must subsequently be subjected to a wet chemical treatment in order to remove foreign substances resulting from grinding, especially dust from attrition of the grinding medium, adherent silica and free silicon which may interfere with the sintering process and/or lead to an undesirable increase in the residual oxygen or metal impurities in the finished sintered body. The dust from attrition of the grinding medium is customarily removed by a hydrochloric acid treatment and silica by a hydrofluoric acid and/or nitric acid treatment (cf. U.S. Pat. No. 4,230,497). Also known for the processing of SiC abrasive grain mixtures is a chemical treatment with hot lye (cf. "Ullmann's Enzyklopadie der technischen Chemie", vol. 21 (1982), page 435).

If free carbon must be removed, an annealing treatment of several hours duration at temperatures of at least 700° C. can be used (cf. DE-A-29 12 443 and W. Bocker et al. in "Powder Metallurgy Int.", vol. 13 (1981), pages 37–39).

Sinterable boron carbide powders are generally produced from coarse-grained, crystalline boron carbide that has been manufactured on an industrial scale, by the melt reduction process, from boric acid and carbon in an electric furnace. The coarse grained boron carbide must first be subjected to intensive grinding to produce a powder of the required particle size and then it is subjected to a chemical treatment to remove undesirable impurities. Sinterable mixtures of silicon carbide and boron carbide can also be produced by grinding a mixture of silicon carbide and boron carbide and then subjecting the ground mixture to chemical treatment to remove sinter-impeding impurities (cf. DE-A-32 18 052).

These known processing methods for the manufacture of sinterable powders have several disadvantages which are exemplified as follows with reference to SiC:

1. The intensive grinding of the abrasive material which is customarily carried out by wet grinding in mills charged with a grinding medium, requires long grinding times to provide the required particle size. The long grinding time and abrasiveness of the material produces considerable wear on the grinding apparatus with a concomitant quantity of metallic impurities in the material. The long grinding time causes a distinct impairment in the quality of the SiC powder. Further, because of tribonchemical reactions which occur, the content of free carbon and silica in the powder is increased.

2. The undesirably high carbon content must be removed by subsequent annealing. The annealing disproportionally affects the smaller particle size portion of the SiC and oxidises it to $SiO_2$.

3. In order to remove the large quantity of metallic impurities introduced by wear of the grinding apparatus, an intensive hydrochloric acid treatment is necessary which disproportionately affects the fine grain portion of the SiC.

4. The large amount of $SiO_2$ produced during the processing must be removed by chemical purification, customarily by an environmentally harmful hydrofluoric acid treatment which generally does not reduce the amount of Si to a desirable level.

These known powder processing methods are, therefore, not only expensive in terms of time and expense but also involve losses in quality and yield.

The solution of the problem is to provide a process for the manufacture of sinterable silicon carbide and/or boron carbide powders having a maximum particle size of 1 μm and finer, by wet grinding an aqueous suspension of the coarse grained material in mills charged with a grinding medium and subsequent chemical treatment, in which process the duration of grinding can be shortened and the purification can be carried out in a simpler and more effective manner without undue reduction in quality and yield of the powders.

BRIEF SUMMARY OF THE INVENTION

According to the present invention, the wet grinding is carried out in the presence of antioxidants and of surfactants. The chemical treatment includes a contact period with potassium hydroxide as a base.

DETAILED DESCRIPTION OF THE INVENTION

Antioxidants are compositions which retard oxidation of the silicon carbide and boron carbide during the wet grinding process. The compositions are believed to act in capturing radicals which cause oxidation. Suitable antioxidants do not interfere with the purity of the silicon carbide and boron carbide powders, e.g. do not result in any undesirable increase in the content of impurities in the powders during the sintering process and particularly metallic impurities.

Suitable antioxidants include phenol antioxidants which include phenols and phenol derivatives, such as alkyl, amino and hydroxy substituted phenols, bisphenols and diphenols. Examples of useful compositions include alkyl phenols, such as tert.-butyl-4-methoxyphenol and 2.6-di-tert.-butyl-4-methylphenol; amino phenols, such as 2-aminophenol and 4-methylaminophenol; bis-phenols, such as 2.2-bis(4-hydroxyphenyl)-propane; diphenols, such as 4.4-dihydroxybiphenyl; and hydroxyphenols, such as 1.2-di-hydroxybenzene(-pyrocatechol) and especially 1.4-di-hydroxybenzene(-hydroquinone) and its derivatives, such as hydroquinone monomethylether and 2.2.4-trimethylhydroquinone.

Arylamine antioxidants which include arylamines and arylamine derivatives are sueful in practice in the invention. They can be further classified as ketone-amine condensation products, diaryldiamines, diarylamines and ketone-diarylamine condensation products. Examples of useful compositions include ketone-amine condensation products, such as dihydrotrimethylquinoline and 6-ethoxy-1.2-dihydro-2.2.4-trimethylquinoline; diaryldi-amines, such as N,N'-diphenyl-p-phenylenediamine and N,N'-di-$\beta$-naphthyl-p-phenylenediamine; diarylamines, such as monooctyl diphenylamine and dioctyl diphenylamine; ketone-diarylamine condensation products, such as the complex mixtures obtained by the reaction of diphenylamine and acetone.

The antioxidants exemplified are for illustration only and one not limiting of the useful compositions.

In wet grinding in an aqueous suspension, according to the invention, hydroquinone and hydroquinone derivatives are the preferred antioxidants. Examples of hydroquinone derivatives are hydroquinone monomethyl ether and 2,2,4-trimethylhydroquinone.

Suitable surfactants include anionic surfactants such as alkanecarboxylates, alkanesulphonates, especially alkylbenzenesulphonates of the dodecylbenzenesulphonate type, alkyl sulphates, ether sulphates and fatty alcohol (ether) sulphates; cationic surfactants such as straight-chain and cyclic ammonium compounds and quaternary ammonium salts; non-ionic surfactants such as polyethers, especially alkylphenol polyglycol ethers and fatty acid esters of polyalcohols; and amphosurfactants such as glycerine derivatives having a betaine structure and sulphobetaines. These surfactants can be used individually or in admixture; quaternary ammonium salts, and also aklylbenzenesulphonates in admixture with alkyl sulphates or alkyl polyglycol ether sulphates are especially useful.

The presence of antioxidants and surfactants in the wet grinding aqueous suspension reduces the grinding time needed to produce the required particle size of 1 $\mu$m and finer. It is possible to reduce the grinding time by approximately 25-30%. The shortening of the grinding time is advantageous since better utilisation of the grinding apparatus is possible and wear of the grinding apparatus, due to the abrasion of grinding medium and stirrer, is lower. For example, in commercial grinding apparatus of the Attritor ® type, the steel ball abrasion is reduced by up to about 40% and the service life of the stirrer is increased by up to about 60%. Due to the lower amount of attrition of the grinding apparatus, the powders contain less contamination from the grinding apparatus. Since there is less residue from the grinding apparatus, the hydrochloric acid treatment, usually necessary for the removal of the iron from the ground materal, can be carried out under gentler conditions and the losses due to dissolution of the fine particle portions in the powders are lower.

An important factor in the case of silicon carbide is that as a result of the addition of the antioxidant and surfactant to the wet grinding medium, the content of free carbon and of silica in the ground powders increases by only a small amount during the grinding operation. The carbon content after grinding is generally less than 1% by weight. Since, for example, in the pressureless sintering of silicon carbide, a carbon content of up to approximately 1% by weight can be tolerated, the costly annealing treatment which was hitherto necessary to remove excess free carbon, can be dispensed with. Therefore, the annealing losses of the fine grain portion of the SiC, which severely reduced the yield, and the associated further increase in the $SiO_2$ content no longer occurs.

In the case of boron carbide, as a result of the addition of antioxidant and surfactant to the wet grinding medium the proportion of undesirable contamination from the grinding apparatus is reduced by up to approximately 25% and the oxygen content is lower by up to approximately 30% when compared to boron carbide ground without the addition of the additives of the invention to the grinding medium.

After wet grinding under the conditions according to the invention, the powders are freed from contamination with mill residue in a known manner such as by a hydrochloric acid treatment. After removal of contamination by mill material, the fine particle size powder is subject to a wet chemical treatment with potassium hydroxide. The ground material is preferably contacted with a 5-50% by of an weight aqueous potassium hydroxide solution, at a temperature in the range of from room temperature to the boiling point of the mixture, during which thorough mixing of the reactant can be ensured by mechanical agitation. It is most preferred to contact the powder with about a 10-20% by weight aqueous potassium hydroxide solutions. At temperatures in the range of 70°-100° C., depending on the $SiO_2$ content, treatment times of 3-6 hours are generally sufficient. Longer treatment times do no harm but generally provide no significant advantage. The powder suspensions are then cooled to room temperature and washed with water to remove the potassium hydroxide solution. It is preferred to wash the powder until the wash water separated from the powder is about neutral. The sinterable powders so treated are separated from the aqueous phase by known means such as centrifugation or filtration and then dried. As used herein, wet chemical treatment is used to denote treatment required to remove free silicon and reduce oxygen and free carbon containing impurities. In accordance with the invention, it is possible to obtain sinterable $\alpha$-SiC powders having a specific surface area of 15 $m^2/g$ (measured according to the BET method), an $O_2$ content of $<0.6\%$ by weight, a content of free carbon of $<1.0\%$ by weight and a content of free Si of 0.0% by weight. According to the BET method, a powder having a maximum particle size of 1 $\mu$m has a suface area of at least 15 $m^2/g$.

If $\alpha$-SiC powders having an even lower $O_2$ content are desired, the treatment with KOH can be carried out at elevated pressure at temperatures of up to 300° C. By treatment at temperatures above about 100° C. and preferably above 150° C. the $O_2$ content in the $\alpha$-SiC powder can be reduced to less than 0.3% by weight.

The yields of SiC obtained overall by the process according to the invention are at least 98% based on the SiC provided to the wet grinding operation. The losses in the fine particle portions of SiC are therefore very low.

In contrast to the known hydrofluoric acid treatment, no free silicon could be detected in the $\alpha$-SiC powders treated with potassium hydroxide in accordance with the present invention.

In addition, it has been demonstrated that when the wet chemical treatment is carried out with an aqueous sodium hydroxide solution or with concentrated ammonia solution instead of potassium hydroxide, under substantially similar conditions, it is not possible to obtain α-SiC powders having an oxygen content of less than about 1.0% by weight.

Using the process of the present invention to process finely ground silicon carbide and boron carbide powders, sinterable α-SiC and/or $B_4C$ powders are obtainable of the required fineness and purity more simply than by the processes known in the art. It is unexpected that the addition of antioxidant and surfactant, according to the invention to the wet grinding medium, there would be produced a powder with a particle size of 1 μm and finer in a shorter grinding period and that the impurities usually introduced or formed as a result of grinding would in some cases become so low that it is possible to dispense completely with their removal, as in the case of carbon in SiC. Since all measures for the removal of impurities not only remove the impurities but also disproportionately affect the small particle size portions of the sinter powder, the elimination or the more gentle application of such measures is critical in avoiding losses in yield, especially losses in the sinterable fine grain portions of the sinter powder. Furthermore, it is unexpected that potassium hydroxide, as the base for the wet chemical treatment, is superior to other bases such as sodium hydroxide or ammonia for removal of adherent silica under the same conditions. Oxygen contents of <0.6% by weight were hitherto achieved only by hydrofluoric acid treatment which, however, left some free silicon in the powders.

In the following Examples, the starting material was a commercial α-SiC powder produced by the Acheson process having the following powder characteristics:

| | |
|---|---|
| mean particle size: | approximately 15 μm |
| $O_2$: | 0.6% by weight |
| $C_{free}$: | 0.6% by weight |
| $Si_{free}$: | 0.2% by weight. |

EXAMPLE 1

Wet grinding

In each case 50 g of the α-SiC powder were suspended in 220 ml of water with the addition of 0.2% by weight hydroquinone as antioxidant and 0.1% by weight of a quaternary ammonium salt as surfactant and ground in a stirred ball mill charged with steel balls for 8 hours or 6 hours at 1200 rev/min stirrer speed. The ball abrasion and the abrasion of the stirrer were then determined in % by weight. After grinding, the powders were subjected to a hydrochloric acid treatment and the content of oxygen, carbon and silicon in the dried powders was determined.

Wet chemical treatment

The powders which had been treated with hydrochloric acid were heated with 20% by weight aqueous potassium hydroxide solution at 80° C. for 3 hours with stirring. After washing and drying the powders, the specific surface area in $m^2/g$, the yield in %, based on the amount of SiC introduced into the wet grinding step, and the content of oxgen, carbon and Si were determined.

For the purpose of comparison, the wet grinding was carried out in water alone without the addition of antioxidant and surfactant and the wet chemical treatment was carried out with hydrofluoric acid (5 ml HF in 20 ml $H_2O$) by stirring for 24 hours at room temperature. The results under the conditions given in each case are summarized in Table 1:

TABLE 1

| Example | 1 a | 1 b | 1 c (comparison) |
|---|---|---|---|
| wet grinding | $H_2O$ + 0.2% A + 0.1% S | $H_2O$ + 0.2% A + 0.1% S | $H_2O$ (without addition) |
| duration of grinding | 8 h. | 6 h. | 8 h. |
| ball abrasion | 91.6% | 78.0% | 144.8% |
| stirrer abrasion | 8.0% | 6.0% | 11.2% |
| product after HCl treatment | | | |
| $O_2$ | 1.2% | 1.0% | 2.2% |
| $C_{free}$ | 0.9% | 0.7% | 1.6% |
| $Si_{free}$ | 0.2% | 0.2% | 0.2% |
| wet treatment | 20% KOH/ 3 h./80° C. | 20% KOH/ 3 h./80° C. | 25% HF/ 24 h./RT |
| end product yield | 98% | 98% | 90% |
| spec. surface area | 19 $m^2/g$ | 17.1 $m^2/g$ | 17.5 $m^2/g$ |
| $O_2$ | 0.38% | 0.36% | 0.44% |
| $C_{free}$ | 0.9% | 0.7% | 1.6% |
| $Si_{free}$ | 0.00% | 0.00% | 0.2% |

A = antioxidant
S = surfactant
RT = room temperature

It can be seen from the data in Table 1, that in the wet grinding, the addition of antioxidant and surfactant produced considerably less ball abrasion and stirrer abrasion during the same grinding period when compared to wet grinding without the antioxidant and sufactant (cf. Example 1a and 1c).

However, with the addition of antioxidant and surfactant and with a shortened duration of grinding the content of free carbon remained below 1% by weight in each case, whereas without the addition of antioxididant and surfactant the free carbon content rose to 1.6% by weight which cannot be tolerated in a pressureless sintering process.

A grinding period of 6 hours (cf. Example 1b) with the addition of antioxidant and surfactant provided a powder with about the same particle size as grinding for 8 hours without the additive in the grinding medium shown by the data for specific surface area (cf. Example 1b and 1c). In the examples, the surface area is used to determine the fineness of the grind according to accepted practices in the art.

After the wet treatment with potassium hydroxide, the yield of SiC was 98% in each case, whereas after the hydrofluoric acid treatment and grinding without the addition of antioxidant and surfactant, the yield had fallen to 90%. In addition, substantially all the free silicon was removed without residue by the KOH treatment.

EXAMPLE 2

In each case 50 g of the α-SiC powder were subjected to a wet grinding of 6 hours' duration and HCl treatment under the same conditions as those described in Example 1b. The wet chemical treatment was then varied as follows:
(a): 10% KOH/3 hours/80° C.;

(b): 20 KOH/3 hours/250° C. under a pressure of 15–20 bars;

(c) (for comparison): concentrated aqueous ammonia solution/72 hours/reflux temperature; in this case, a repetition of the treatment did not produce any better result in respect of oxygen content;

(d) (for comparison): 20% NaOH/3 hours/80° C.; in this case, lengthening of the reaction time to 48 hours did not give any better result in respect of oxygen content.

The results for the end products investigated are summarized in Table 2:

TABLE 2

| Example | 2 a | 2 b | 2 c (for comparison) | 2 d (for comparison) |
|---|---|---|---|---|
| wet treatment | 10% KOH/ 3 h./80° C. | 20% KOH/ 3 h./250° C. 15–20 bars | conc. NH$_3$/ 72 h./ reflux temperature | 20% NaOH/ 3 h./80° C. |
| end product spec. surface area | 17.0 m$^2$/g | 17.0 m$^2$/g | 17.0 m$^2$/g | 17.0 m$^2$/g |
| O$_2$ | 0.52% | 0.29% | 1.4% | 1.0% |
| C$_{free}$ | 0.7% | 0.7% | 0.7% | 0.7% |
| Si$_{free}$ | 0.00% | 0.00% | 0.00% | 0.00% |

As can be seen from the data in Table 2, the KOH, treatment under pressure produced a reduction in the oxygen content to less than 0.3% by weight (cf. Example 2b); also with 10% KOH the oxygen value still remained below 0.6% by weight (Example 2a), whereas with treatment with concentrated ammonia and 20% NaOH, the oxygen content could be reduced to values of 1.0 and higher (cf. Example 2c and 2d). All treatments removed free silicon without leaving a residue.

EXAMPLE 3

100 kg of the α-SiC powder were subjected, under the same conditions as those described in Example 1b, to a wet grinding of comparable duration. For the wet chemical treatment, 100 liters of 20% by weight, aqueous potassium hydroxide solution were added to the powders and the whole was heated at 80° C. for 3 hours while stirring. After cooling to room temperature, the powder was washed until the washing water gave a neutral reaction and then dried.

Characteristics of the end product:

specific surface area: 17.0 m$^2$/g
O$_2$: 0.58%
C$_{free}$: 0.7%
Si$_{free}$: 0.00%.

This example demonstrates that equally good results can be obtained in a large-scale production trial using the combination of steps according to the invention.

We claim:

1. A process for the manufacture of a sinterable powder comprising silicon carbide and/or boron carbide, which process comprises:
   (a) forming an aqueous suspension comprising silicon carbide and/or boron carbide;
   (b) introducing into said aqueous suspension at least one surfactant and at least one antioxidant selected from the group consisting of phenol antioxidants and arylamine antioxidants;
   (c) grinding the aqueous suspension comprising silicon carbide and/or boron carbide, the surfactant and antioxidant, thereby forming a ground powder;
   (d) contacting the ground powder with an aqueous solution comprising potassium hydroxide; and
   (e) recovering the ground powder from the aqueous solution.

2. The process of claim 1 wherein the amount of water in said aqueous suspension is about four times by weight the amount of said silicon carbide and/or boron carbide.

3. The process according to claim 1 wherein the antioxidant is a phenol antioxidant.

4. The process according to claim 1 wherein the antioxidant is at least one member selected from the group consisting of hydroquinone and hydroquinone derivatives.

5. The process according to claim 1 wherein the surfactant is a quarternary ammonium salt.

6. The process according to claim 1 wherein the ground powder is contacted with a 5–50% by weight aqueous potassium hydroxide solution.

7. The process according to claim 1 wherein contacting with the aqueous solution comprising potassium hydroxide is carried out under normal pressure at temperatures in the range of from room temperature to the boiling temperature of the aqueous solution comprising potassium hydroxide.

8. The process according to claim 1 wherein contacting with the aqueous solution comprising potassium hydroxide is carried out under elevated pressure at temperatures of up to 300° C.

9. A process of claim 1 wherein the ground powder of step (c) is freed from contamination by a grinding residue before being contacted with the aqueous solution comprising potassium hydroxide.

10. A process of claim 9 wherein the grinding residue comprises iron, and the ground powder is contacted with an aqueous solution comprising hydrochloric acid.

* * * * *